US008337582B2

(12) United States Patent
Feisthauer et al.

(10) Patent No.: US 8,337,582 B2
(45) Date of Patent: Dec. 25, 2012

(54) ADAPTER FOR A COMPRESSED AIR FILTER AND USE OF THE SAME

(75) Inventors: Michael Feisthauer, Meeder (DE);
Norbert Fischer, Meeder (DE);
Gerhard Leidner, Coburg (DE);
Norbert Bär, Sonnefeld (DE)

(73) Assignee: Kaeser Kompressoren AG, Coburg (DE)

( * ) Notice: Subject to any disclaimer, the term of this patent is extended or adjusted under 35 U.S.C. 154(b) by 514 days.

(21) Appl. No.: 12/529,662

(22) PCT Filed: Feb. 29, 2008

(86) PCT No.: PCT/EP2008/052540
§ 371 (c)(1),
(2), (4) Date: Sep. 2, 2009

(87) PCT Pub. No.: WO2008/107412
PCT Pub. Date: Sep. 12, 2008

(65) Prior Publication Data
US 2010/0058723 A1  Mar. 11, 2010

(30) Foreign Application Priority Data
Mar. 2, 2007  (EP) .................................... 07103403

(51) Int. Cl.
*B01D 46/00* (2006.01)
(52) U.S. Cl. ................ 55/418; 55/490; 55/498; 55/502; 55/508; 210/437; 210/440; 210/443; 210/444
(58) Field of Classification Search .................... 55/418, 55/498, 502, 508, DIG. 17, 490; 210/443, 210/444, 497.01, 437, 440, 441
See application file for complete search history.

(56) References Cited

U.S. PATENT DOCUMENTS

| 4,336,872 | A | * | 6/1982 | Noda et al. ..................... 193/2 R |
| 4,585,924 | A | | 4/1986 | Pakula |
| 5,291,863 | A | | 3/1994 | Jones |
| 6,245,232 | B1 | | 6/2001 | Craft |
| 6,440,201 | B1 | | 8/2002 | Billiet |
| 6,528,021 | B1 | * | 3/2003 | Williams ....................... 422/121 |
| 6,936,084 | B2 | * | 8/2005 | Schlensker et al. ............. 55/321 |
| 2004/0035097 | A1 | | 2/2004 | Schlensker et al. |
| 2007/0084785 | A1 | | 4/2007 | Schuster et al. |
| 2007/0199881 | A1 | | 8/2007 | Girondi |

FOREIGN PATENT DOCUMENTS

DE  100 52 524 A1  4/2002
(Continued)

*Primary Examiner* — Robert Clemente
(74) *Attorney, Agent, or Firm* — Panitch Schwarze Belisario & Nadel LLP

(57) ABSTRACT

A compressed air filter adapter for connecting a filter element (12) to a filter connection housing (13) includes a flow duct (21) enclosed by a wall (20) for compressed air, the flow duct (21) at a first end being delimited by a first opening (14), having an inner contour (142) defined by a first edge (141) and an outer contour (143), and at a second end by a second opening (15), having an inner contour (152) defined by a second edge (151) and an outer contour (153). The first opening (14) is provided for connection to a filter connection housing (13) and forms an opening cross-section (16), defined by the inner contour (142) of the first opening (14). The second opening (15) defines an opening on the filter side and forms a second opening cross-section (17), defined by the inner contour (152) of the second opening (15).

34 Claims, 7 Drawing Sheets

FOREIGN PATENT DOCUMENTS

| | | |
|---|---|---|
| DE | 103 09 428 A1 | 9/2004 |
| EP | 1 310 665 A1 | 5/2003 |
| EP | 1 042 043 B1 | 5/2004 |
| WO | 99/30799 A1 | 6/1999 |
| WO | 02/053258 A1 | 7/2002 |
| WO | 2005/118105 A1 | 12/2005 |

* cited by examiner

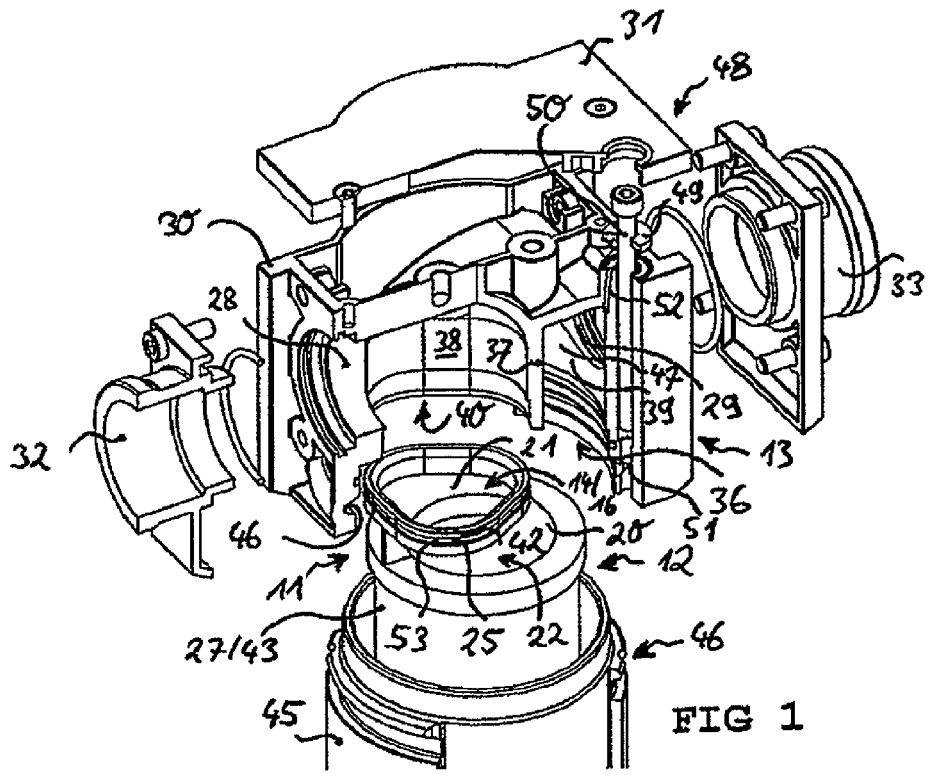
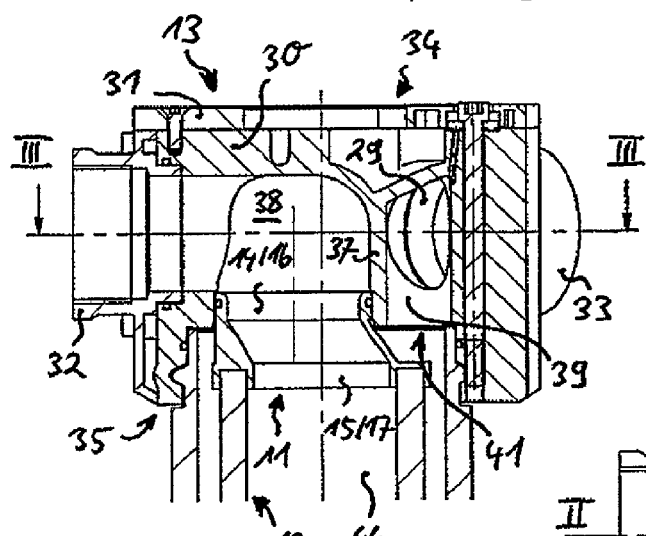
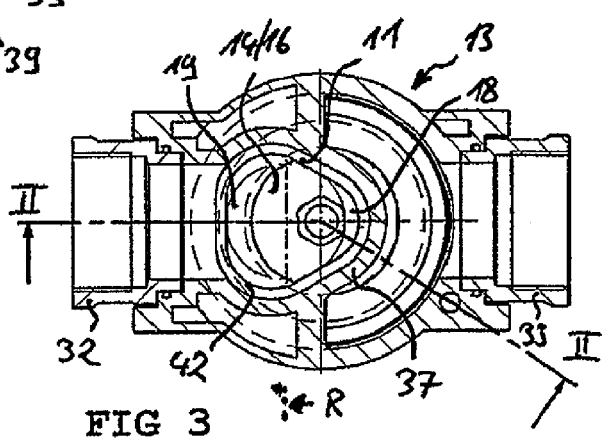

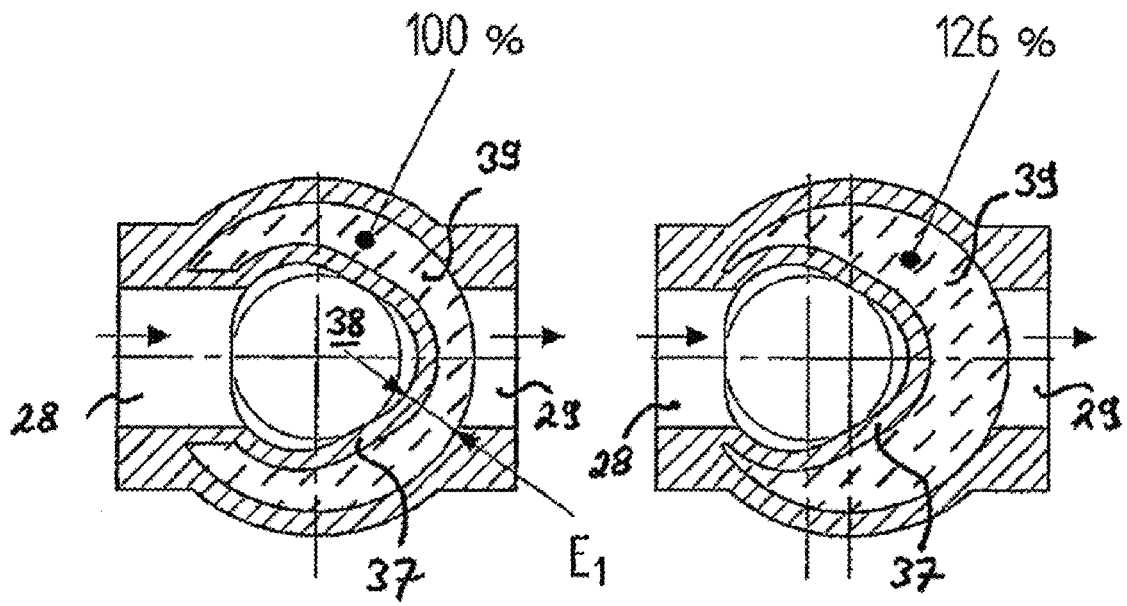
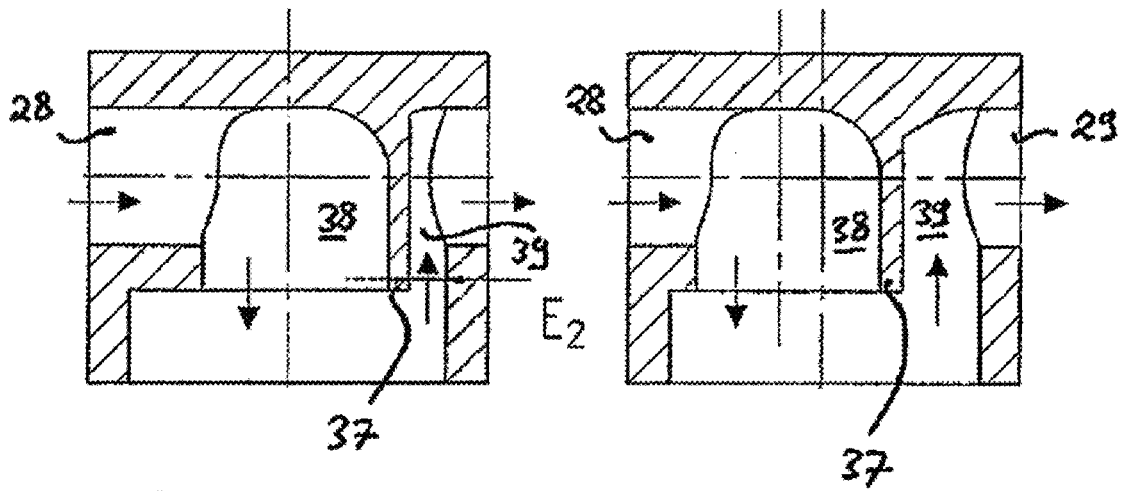
FIG 9

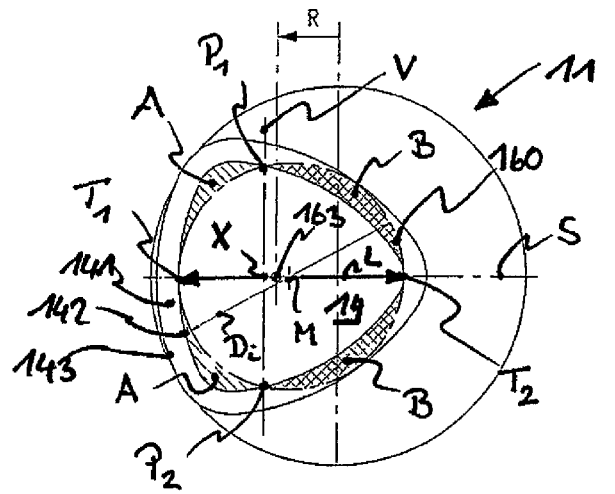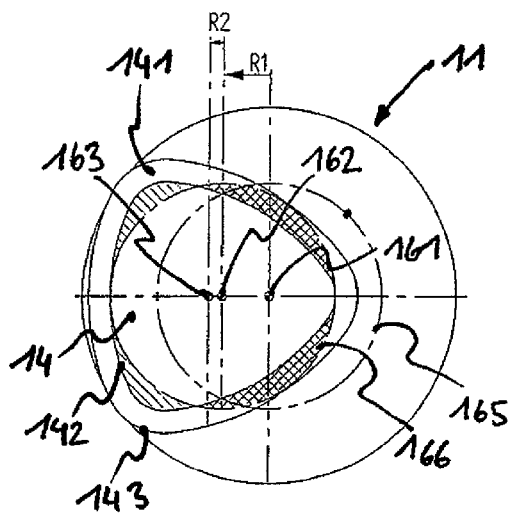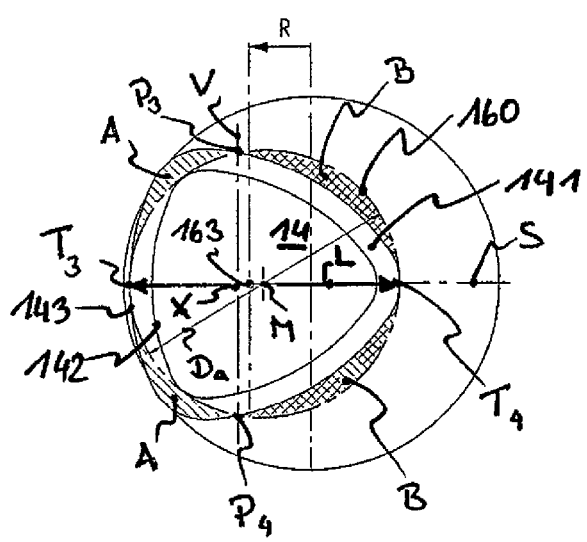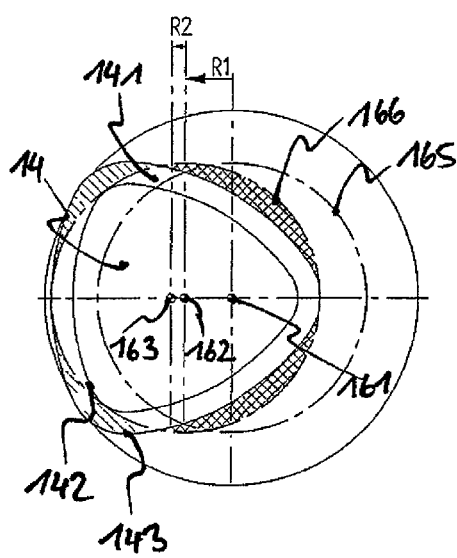
FIG 13a
FIG 13b

ADAPTER FOR A COMPRESSED AIR FILTER AND USE OF THE SAME

CROSS-REFERENCE TO RELATED APPLICATIONS

This application is a Section 371 of International Application No. PCT/EP2008/052540, filed Feb. 29, 2008, which was published in the German language on Sep. 12, 2008, under International Publication No. WO 2008/107412 A1 and the disclosure of which is incorporated herein by reference.

BACKGROUND OF THE INVENTION

The invention relates to a compressed air filter adapter for connecting a filter element to a filter connection housing, wherein the adapter has a flow duct enclosed by a wall for compressed air, wherein the flow duct is delimited at a first end by a first opening having an inner contour defined by a first edge and an outer contour, and at a second end by a second opening having an inner contour defined by a second edge and an outer contour, wherein the first opening is provided for connection to a filter connection housing and forms an opening cross-section defined by the inner contour of the first opening, and wherein the second opening defines an opening on the filter side and forms a second opening cross-section defined by the inner contour of the second opening, and a method of connecting a filter element to a filter connection housing.

Filter arrangements for compressed air are sufficiently well-known from the prior art, e.g., from European Patent No. EP 1 042 043 B1. In most cases, such compressed air arrangements are placed into a flow of compressed air in such a manner that the entire compressed air of the flow of compressed air is guided across a filter element. Since due to its filtering function, the filter element clogs over extended operating times, that is to say dirt particles are captured within the filter element, it has to be replaced at defined or variable maintenance intervals. To facilitate this process of replacing the filter element, the filter element is seated within a filter connection housing, wherein the filter connection housing remains fixedly connected to the line conducting the flow of compressed air.

However, restricted flow relationships may form in the filter connection housing due to the various target settings such as a space-saving installation into the line conducting the compressed air to be filtered, accessibility to the filter element, and reliable sealing between the filter element and the filter connection housing.

BRIEF SUMMARY OF THE INVENTION

The object of the present invention, in contrast, provides a compressed air filter adapter which ensures a simple and reliable connection of a filter element to a filter connection housing and at the same time enables a comparatively favorable flow conduction within the filter connection housing.

The object is in particular solved by a compressed air filter adapter for connecting a filter element to a filter connection housing, wherein the adapter has a flow duct enclosed by a wall for compressed air, wherein the flow duct is delimited at a first end by a first opening having an inner contour defined by a first edge and an outer contour, and at a second end by a second opening having an inner contour defined by a second edge and an outer contour, wherein the first opening is provided for connection to a filter connection housing and forms an opening cross-section defined by the inner contour of the first opening, and wherein the second opening defines an opening on the filter side and forms a second opening cross-section defined by the inner contour of the second opening, wherein the inner contour of the first opening and the inner contour of the second opening are offset from each other such that the surface center of gravity of the first opening cross-section is displaced in relation to the normal extending from the surface center of gravity of the second opening cross-section in an offset direction, and wherein the outer contour of the first opening has a basic shape that deviates from the circular such that the outer contour is derived from a transformation of a circle that is centrically aligned in relation to the normal extending from the surface center of gravity of the second opening, the circle in the direction of the offset direction being displaced by a length R1 and defining a displaced circle, and on the side of the circle pointing in the offset direction comprising constrictions or expansions by removing or adding surface sections, and on the side pointing opposite from the offset direction comprising corresponding expansions or constrictions by adding or removing substantially equally large surface sections.

The object is further solved by a compressed air filter adapter for connecting a filter element to a filter connection housing, wherein the adapter has a flow duct enclosed by a wall for compressed air, wherein the flow duct is delimited at a first end by a first opening having an inner contour defined by a first edge and an outer contour, and at a second end by a second opening having an inner contour defined by a second edge and an outer contour, wherein the first opening is provided for connection to a filter connection housing and forms an opening cross-section defined by the inner contour of the first opening, and wherein the second opening defines an opening on the filter side and forms a second opening cross-section defined by the inner contour of the second opening, wherein the inner contour of the first opening and the inner contour of the second opening are offset from each other such that the surface center of gravity of the first opening cross-section is displaced in relation to the normal extending from the surface center of gravity of the second opening cross-section in an offset direction, wherein the inner contour is symmetrical to a center line S oriented in relation to the offset direction, wherein the inner contour is configured to be completely convex circumferentially, wherein an imaginary circle contacts the inner contour at two diametrically opposite tangential points on the center line, wherein the circle intersects the inner contour at two intersection points, wherein, in relation to a connection line V between the intersection points, the circle on the side situated in the offset direction lies completely inside the inner contour, and on the side situated opposite the offset direction lies completely outside the inner contour.

The object is further solved by a compressed air filter adapter for connecting a filter element to a filter connection housing, wherein the adapter has a flow duct enclosed by a wall for compressed air, wherein the flow duct is delimited at a first end by a first opening having an inner contour defined by a first edge and an outer contour, and at a second end by a second opening having an inner contour defined by a second edge and an outer contour, wherein the first opening is provided for connection to a filter connection housing and forms an opening cross-section defined by the inner contour of the first opening, and wherein the second opening defines an opening on the filter side and forms a second opening cross-section defined by the inner contour of the second opening, wherein the inner contour of the first opening and the inner contour of the second opening are offset from each other such that the surface center of gravity of the first opening cross-section is displaced in relation to the normal extending from the surface center of gravity of the second opening cross-section in an offset direction, wherein the outer contour is symmetrical to a center line S oriented in relation to the offset direction, wherein the outer contour is configured to be completely convex circumferentially, wherein an imaginary circle contacts the outer contour at two diametrically opposite tangential points on the center line, wherein the circle intersects the outer contour at two intersection points, wherein, in relation to a connection line V between the intersection points, the circle on the side situated in the offset direction lies completely inside the outer contour, and on the side situated opposite the offset direction lies completely outside the outer contour.

The object is further solved by a compressed air filter adapter for connecting a filter element to a filter connection housing, wherein the adapter has a flow duct enclosed by a wall for compressed air, wherein the flow duct is delimited at a first end by a first opening having an inner contour defined by a first edge and an outer contour, and at a second end by a second opening having an inner contour defined by a second edge and an outer contour, wherein the first opening is provided for connection to a filter connection housing and forms an opening cross-section defined by the inner contour of the first opening, and wherein the second opening defines an opening on the filter side and forms a second opening cross-section defined by the inner contour of the second opening, wherein the outer contour of the first opening has a basic shape that deviates from the circular such that the outer contour is derived from a transformation of an imaginary circle, wherein the outer contour comprises expansions on a side of a diameter line L perpendicular to the normal extending from the surface center of gravity of the second opening, and comprises constrictions on the other side, wherein the outer contour of the first opening has the basic shape of an isosceles triangle, wherein the area facing the tip of the triangle forms the constrictions and the area facing the base forms the expansions, and wherein both the angles and the sides are configured to be rounded and are able to describe the rounded shapes of the sides of the triangle by circular arcs of a first circle having a first radius, and are able to describe the rounded shapes of the angles of the triangle by circular arcs of a second circle having a second radius, the circular arcs tangentially merging into one another, and the circular arcs comprising at least three imaginary median circle points deviating from each other, and wherein the ratio of the second radius to the first radius is between 2 and 4.

A central idea of the present invention is that the inner contour of the first opening and the inner contour of the second opening are offset from each other in the inventive compressed air filter adapter such that the surface center of gravity of the first opening cross-section is displaced in relation to the normal extending from the surface center of gravity of the second opening cross-section in an offset direction.

The offset arrangement of the openings achieves a free space in the filter connection housing on the side opposite the offset direction, which may be used for fluidic purposes and/or further installations.

Another central idea of the present invention is that in the compressed air filter adapter according to the invention the outer contour of the first opening has a basic shape deviating from the circular shape such that the outer contour is derived from a transformation of a circle that is centrically aligned in relation to the normal extending from the surface center of gravity of the second opening, the circle in the direction of the offset direction being displaced by a length R1 and defining a displaced circle, and comprising constrictions or expansions on the side of the circle pointing in the offset direction by removing or adding surface sections, and comprising corresponding expansions or constrictions on the side pointing opposite from the offset direction by adding or removing essentially equally large surface sections.

The basic shape of the outer contour of the first opening, which deviates from the circular shape, is achieved in that flow areas may be defined which support an optimum flow of compressed air within the filter connection housing and assist in reducing the flow resistance.

In a preferred embodiment, the constrictions and expansions are arranged mirror-symmetrical to a center line S oriented in the offset direction. Arranging the expansions and constrictions to be mirror-symmetrical supports the manufacturing process of the compressed air filter adapter according to the embodiment, which is ideally fabricated from two mirror-symmetrical molded parts. Such molded parts being in mirror-symmetrical relation to each other may be produced in a particularly simple manner by mould and die production for injection molding.

In a further preferred embodiment, the outer contour may have a substantially convex edge. A substantially convex edge facilitates manipulation especially when inserting the adapter into the filter arrangement since there are no mould portions to unintentionally engage into other components.

A further embodiment provides for the constrictions and expansions to not come into any contact with the two areas of the intersection points of a center line S oriented in the offset direction (R) with the circle displaced in the offset direction. Consequently, it is ensured that at least two predefined points of the outer contour always correspond to the diameter of the circle displaced in the offset direction. Two points of this kind are particularly suited for characterizing the size of the outer contour of the compressed air filter adapter and hence for classifying the compressed air filter adapter itself.

A further embodiment of the compressed air filter adapter according to the invention is characterized in that the surface center of gravity of the circle displaced in the offset direction is again displaced by a length R2 in the offset direction by realizing the constrictions and expansions in the offset direction. Thus, with the principally predefined form of the constrictions and expansions, the repeated displacement of the surface center of gravity constitutes a numerical measure for the deviation from an actual circular shape, and may be used in fluidic calculations and modelings as a suitable variable.

In a preferred configuration, the expansions are formed in the offset direction, and the constrictions are formed against the offset direction. Insofar, the idea of the enlarged free space in the direction opposite the displacement direction is enhanced further, since a space gain on the side opposite the offset direction in the first place is also achieved by the offset.

According to a basic idea of the present invention, a free space within the filter connection housing, which is advantageous from a fluidic point of view, may already be obtained by displacing a first opening cross-section present in the form of a circle in the offset direction. Due to the fact that a non-rotationally symmetrical configuration deviating from the circular shape of the outer contour is in addition realized with respect to the first opening, the effect is even further enhanced. In a first specific configuration, the outer contour of the first opening may have the basic shape of a triangle, wherein the tip of the triangle is situated on a center line S oriented in the offset direction, and the base of the triangle perpendicularly intersects the center line S, and wherein the area facing the tip of the triangle forms the constrictions, and the area facing the base forms the expansions of the first opening cross-section. A triangular basic shape supports the insertion of the compressed air filter adapter especially when the insertion takes place "upside down." Hence, the first opening has to be inserted into a filter connection housing first, since in this case the insertion may take place in a tilted manner.

In one specified configuration, the outer contour of the first opening has the basic shape of an isosceles triangle. Further triangular geometries, such as a rectangular arrangement, however, are at the skilled person's discretion. Moreover, according to the design, other polygonal geometries such as quadrangular or other polygonal geometries are possible.

In a specific configuration according to the design, the angles of the triangle are formed to be rounded. The degree of the rounded shapes may in this case be realized to be different or also uniform depending on the angle.

A further embodiment may provide for the sides of the triangle to be realized as rounded. In a case of the angles of the triangle also having rounded shapes, the individual rounded shapes are further adapted to each other such that a continuous and smooth transition is given between the individual rounded shapes. The provision of rounded shapes not only reduces the risk of injury to the user but also the danger of damage to the adapter.

In a specific preferred embodiment, the rounded shapes of the sides of the triangle may be described by circular arcs of a first circle having a first radius, and the rounded shapes of the angles of the triangle may be described by circular arcs of a second circle having a second radius, wherein the circular arcs tangentially merge into one another, and the circular arcs comprise at least three imaginary median circle points deviating from each other. Thus, an adaptation of the individual rounded shapes may take place with respect to each other such that a continuous and smooth transition is given between the individual rounded portions.

One configuration of the compressed air filter adapter is characterized in that the ratio of the second radius to the first radius is at least 1.5 and/or less than 10.

A further embodiment may provide for the ratio of the second radius to the first radius to be between 2 and 4. Due to these numerical ratios of the radii, particularly good flow conditions may be realized within the compressed air filter adapter.

A further development of the compressed air filter adapter may provide for the basic shape of the inner contour of the first opening to substantially correspond to the basic shape of the outer contour of the first opening. Accordingly, the edge of the first opening which separates the inner contour and the outer contour is largely of a uniform width, and the compressed air filter adapter may be manufactured in a material-saving manner.

In a specific preferred configuration, the first opening cross-section and the second opening cross-section are arranged substantially in parallel to each other. As an alternative, it may be provided for the two opening cross-sections to be at a predetermined acute angle to each other.

In a first possible embodiment, the adapter may be formed to be a separate component for connection to a filter element as well as to the filter connection housing.

In an alternative embodiment, the adapter may be integrally molded to the filter element, together forming a filter unit.

Although the "free space" attained by the offset according to the invention, as well as by the basic shape of the outer contour of the first opening deviating from the circular shape, may also be used for other installations, flow ducts, etc., one preferred embodiment provides for the air flow entering into or exiting from the filter element to circulate around the adapter. In this specific configuration, the wall of the adapter constitutes an exterior flow guiding surface or comprises such an exterior flow guiding surface so as to guide a flow of compressed air past the outside of the adapter.

In a preferred configuration, the flow guiding surface is formed so as to substantially follow the offset between the first opening and the second opening.

The adapter is preferably configured such that in the projection of the first opening cross-section onto the second opening cross-section, the first opening cross-section is situated in part outside the second opening cross-section.

It may further be provided for the second opening cross-section to also be situated in part outside the first opening cross-section in this projection.

Finally, it may also be provided for the first opening cross-section to be situated in part outside the second opening cross-section in the projection of the second opening cross-section onto the first opening cross-section or for the second opening cross-section to be also situated outside the first opening cross-section in this projection.

At least one circumferential sealing means may be formed on the wall in the adapter according to the invention for establishing a fluid-tight seal with respect to the filter connection housing with the filter element inserted in the operating position. This sealing means may be merely placed onto the edges of the first and second opening of the compressed air filter adapter, for example, or may be inserted into predetermined recesses formed in the same. A sealing effect may in this case be achieved by any sealing material common in the industry such as rubber or a correspondingly formed plastic material.

One embodiment of the compressed air filter adapter may provide for the connection line to intersect the center line S at a point displaced in the offset direction with respect to the surface center of gravity of the inner contour.

A further development of the compressed air filter adapter may provide for the median point of the circle on the center line S to be situated on the side opposite the offset direction in relation to the surface center of gravity of the inner contour. Further, it is also provided for the inner contour to have a triangular basic shape with preferably rounded edges and/or angles.

One embodiment of the compressed air filter adapter may provide for the connection line to intersect the center line S at a point displaced in the offset direction with respect to the surface center of gravity of the outer contour.

Another further development of the compressed air filter adapter may provide for the median point of the circle on the center line to be situated on the side opposite the offset direction with respect to the surface center of gravity of the outer contour. Further, it is also provided for the outer contour to have a triangular basic shape with preferably rounded edges and/or angles.

The invention also encompasses a filter element comprising a filter element having a flat inflow/outflow surface, wherein the filter element has a cylindrical basic shape, as well as an integrally molded adapter as described above.

Furthermore claimed is a filter arrangement comprising a filter connection housing, a filter element and an adapter as described and claimed herein, with the adapter being provided for connecting the filter element to the filter connection housing.

The design may also provide for the wall of the adapter to constitute or comprise an exterior flow guiding surface for conducting a flow of compressed air guided past the outside of the adapter to a flow opening in such a manner that there is at least a local reduction of the flow resistance due to the extension of the flow guiding surface. Such a provision in particular proves to be of important advantage when large air volumes have to flow through the filter arrangement and pressure ratios therefore can be configured to be improved or optimized.

One specific embodiment provides for the flow resistance to be reduced by enlarging the cross-section of the flow duct. An enlargement of the cross-section immediately results in a reduction of the flow velocity of the medium and, as a consequence, reduction of the back pressure in the flow direction.

A further embodiment may provide for the filter connection housing to comprise a first flow opening as an inlet or outlet, and a second flow opening as an outlet or inlet, wherein the offset direction of the adapter is oriented in the direction toward the first flow opening. As a consequence, the flow of compressed fluid to the outlet or inlet may be influenced in a fluid-dynamically advantageous manner.

Finally, a method of connecting a filter element to a filter connection housing is claimed, wherein the filter connection housing comprises a first flow opening and a second flow opening, wherein an adapter is used for connecting the filter element to the filter connection housing, wherein the adapter has a flow duct enclosed by a wall for compressed air, wherein the flow duct is delimited at a first end by a first opening having an inner contour defined by a first edge and an outer contour, and at a second end by a second opening having an inner contour defined by a second edge and an outer contour, wherein the first opening is provided for connection to a filter connection housing and forms an opening cross-section defined by the inner contour of the first opening, and wherein the second opening defines an opening on the filter side and forms an opening cross-section defined by the inner contour of the second opening, wherein the inner contour of the first opening and the inner contour of the second opening are offset from each other such that the surface center of gravity of the first opening cross-section is displaced in relation to the normal extending from the surface center of gravity of the second opening cross-section in an offset direction, and wherein the outer contour of the first opening has a basic shape that deviates from the circular shape such that the outer contour is derived from a transformation of a circle that is centrically aligned in relation to the normal extending from the surface center of gravity of the second opening, the circle in the direction of the offset direction being displaced by a length R1 and defining a displaced circle, and comprising constrictions or expansions on the side of the circle pointing in the offset direction by removing or adding surface sections, and comprising corresponding expansions or constrictions on the side pointing opposite from the offset direction by adding or removing essentially equally large surface sections, and wherein the filter element is joined to the filter connection housing through an adapter in a compressed fluid-tight manner, such that the flow path from the first flow opening to the second flow opening is guided through the filter element.

BRIEF DESCRIPTION OF THE SEVERAL VIEWS OF THE DRAWINGS

The foregoing summary, as well as the following detailed description of the invention, will be better understood when read in conjunction with the appended drawings. For the purpose of illustrating the invention, there are shown in the drawings embodiments which are presently preferred. It should be understood, however, that the invention is not limited to the precise arrangements and instrumentalities shown. In the drawings:

FIG. 1 is an exploded, top perspective view of a first embodiment of a filter arrangement according to the invention;

FIG. 2 is a sectional view of the filter arrangement according to FIG. 1 taken along the line II-II shown in FIG. 3;

FIG. 3 is a sectional view of the filter arrangement according to FIG. 1 taken along the line shown in FIG. 2;

FIG. 9 is a series of schematic views for illustrating the effect achieved by the offset in a filter connection housing having identical outer contours;

FIG. 13A is two schematic views illustrating the representation of the outer contour of the first opening deviating from the circular, according to the embodiment of the adapter shown in FIGS. 10-12 based on an imaginary circle;

FIG. 13b is two schematic views for illustrating the derivation of the contour of the first opening from the circular by a transformation according to the embodiment of the adapter shown in FIGS. 10-12.

DETAILED DESCRIPTION OF THE INVENTION

Figures 4, 5, 6:
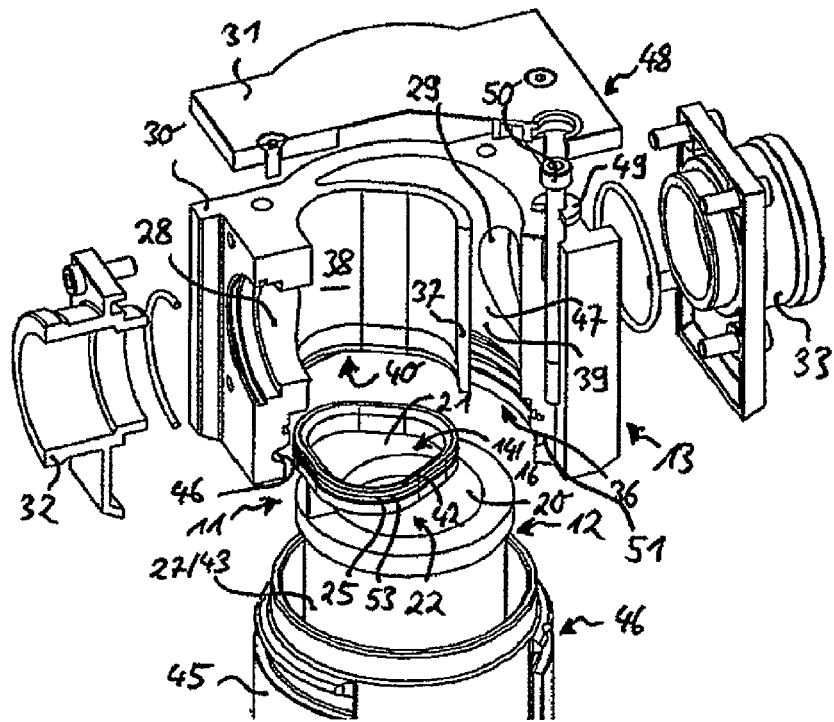
FIG. 4 is a top perspective, exploded view of a second embodiment of a filter arrangement according to the invention.
FIG. 5 is a sectional view of the filter arrangement according to FIG. 4 taken along the line V-V shown in FIG. 6.
FIG. 6 is a sectional view of the filter arrangement according to FIG. 4 taken along the line VI-VI shown in FIG. 5.

In FIG. 1, an embodiment of a filter arrangement according to the invention is illustrated in a perspective exploded view. The filter arrangement first of all comprises a filter connection housing 13 having a first flow opening 28 and a second flow opening 29. In one specific configuration, the first flow opening 28 of the filter connection housing 13 may define an inflow opening, and the second flow opening 29 of the filter connection housing 13 may define an outflow opening. The through-flow direction, however, could also be inverse.

The filter connection housing 13 in the present embodiment consists of a base body 30, a cover 31 provided on an upper side 34, and two connection flanges 32, 33 on the first flow opening 28 and the second flow opening 29 respectively for connection to a compressed fluid line or for connecting a further component through which flows compressed fluid, e.g. a further filter element.

At a lower side 35 opposite the upper side 34, the filter connection housing 13 comprises a filter connection opening 36 for enabling a filter element 12 to be connected to the filter connection housing 13 in a compressed fluid-tight manner by an adapter 11.

For this purpose, an inner space of the filter connection housing 13 is divided by a partition 37 into a first chamber 38 open towards the bottom and a second chamber 39. In this case, the first chamber 38 connects to the first flow opening 28. The second chamber 39, however, connects to the second flow opening 29. The first chamber 38 is in this case partially enclosed by the second chamber 39 so that the first chamber 38 could also be referred to as a partially enclosed chamber, and the second chamber 39 as a partially enclosing chamber. Facing the lower side of the filter connection housing 13, the first chamber 38 is formed to be open while forming a connection opening 40 substantially triangular in cross-section. At its end facing the lower side 35, the second chamber 39 is formed to be open while also forming an opening 41.

The filter element 12 is inserted into the filter connection housing 13 above the already mentioned adapter 11 through the filter connection opening 36 in a compressed fluid-tight manner. For this purpose, the adapter 11 comprises a connection profile 42 corresponding to the connection opening 40 of the first chamber 38. The connection profile 42 of the adapter 11 thereby encloses an opening 14 in the adapter 11, with this first opening comprising a first opening cross-section 16 of an also substantially triangular configuration. Both the triangular configuration of the connection opening 40 and the substantially triangular configuration of the first opening cross-section 16 are a substantially equilateral triangle with rounded angles. Since the edge of the adapter 11 forming the connection profile 42 in the present embodiment is dimensioned to be equally thick over the entire circumference, the first opening cross-section 16 plus the circumferential edge of a uniform thickness and a defined insertion tolerance corresponds to the cross-section of the connection opening 40 in the filter connection housing 13. Exterior to the edge of the adapter 11 forming the connection profile 42, a circumferential sealing means 25 is further retained within a circumferential groove 53, with the sealing means 25 effecting a sealing between the outside of the connection profile 42 of the adapter 11 and the inner wall of the first chamber 38 in the filter connection housing.

Due to the triangular configuration of the connection opening 40 and the connection profile 42 of the adapter 11, an anti-twist protection is defined at the same time in such a way that the filter element 12 can only be inserted in the exactly given angular position. Due to the offset of the adapter 11 first resulting in three positioning possibilities, and despite the realization of the connection opening 40 and the connection profile 42 in the form of an equilateral triangle, it is only possible to insert the adapter 11 and the filter element 12, respectively, such that the side of the connection profile 42 which is situated most distant with respect to the center axis of the filter element 12 faces the first flow opening 28 of the filter connection housing 13.

The configuration of the present embodiment of adapter 11 will be discussed in detail below referencing FIGS. 1 to 3.

The adapter 11 is in this case permanently joined to the filter element 12, actually is directly attached at the front side of a cylindrically shaped filter casing 43, which at the same time defines an inflow or outflow surface 27 of the filter element 12, in this specific case an outflow surface. A central duct 44 is provided inside the filter element 12, from which the compressed fluid passes through the filter material and exits at the filter casing 43.

In an alternative embodiment, the flow direction could also be inverse; i.e. the compressed fluid could enter at the filter casing 43, flow through the filter material and be collected in the central duct 44 and discharged from the filter element 12.

The adapter 11 comprises a flow duct 21 for the compressed fluid, which is enclosed by a wall 20. The compressed fluid is guided from the first opening 14 inside the flow duct 21 to a second opening 15 on the filter side, which defines a second opening cross-section 17. The first opening 14 and the second opening 15 of the adapter 11 are mutually offset in an offset direction (R) such that the surface center of gravity of the first opening 14 is displaced in relation to the normal extending from the surface center of gravity of the second opening 15, specifically by about an offset of 10-50% of a diameter of the first opening 14, preferably 20-40% of a diameter of the first opening 14.

The triangular opening cross-section 16 of the first opening 14 passes over into the second opening cross-section 17 of the second opening 15 via the wall 20 defining the flow duct 21. In the embodiment specifically illustrated here, the second opening cross-section 17 is configured to be of a circular shape. Furthermore, the wall 20 is shaped such that the flow duct 21 comprises an at least substantially equal cross-sectional area along its extension.

The filter element 12 is received in a cylindrically shaped filter cover cap 45 which is closed at the end. The filter cover cap 45 may be closed in a fluid-tight manner with the filter connection housing 13, in particular by a bayonet catch 46. Insofar as a compressed fluid-tight connection is realized between the filter connection housing 13 and the filter cover cap 45 by a bayonet catch 46, the filter element 12 will be received to be rotatable within the filter cover cap 45, since the filter element 12, with its connection profile 42, will engage into the first chamber 38 in a non-rotatable manner when being placed on or inserted into the filter connection housing 13.

As will be obvious in particular from FIG. 2, due to the offset of the adapter 11 in the direction toward the first flow opening 28, a free space or antechamber 47 is created at the opposite side, specifically in the area adjacent to the second flow opening 29, the free space or antechamber 47 being fluid-dynamically advantageous, namely ensuring an improved outflow of compressed fluid from the filter connection housing 13 through the second flow opening 29 in the specific embodiment. Specifically, the compressed fluid exiting the filter casing 43 and returned inside the filter cover cap 45 toward the filter connection housing 13 may merge in the area of the adapter 11, which by its wall 20 at the outside thereof defines a flow guiding surface 22, and may be collected in the direction toward the second flow opening 29. The volume of the antechamber 47 ensures that the compressed fluid can be discharged past the adapter 11 and from the second flow opening 29 at an only very low flow resistance.

A filter arrangement is thus proposed having low flow losses in the inflow and outflow area comprising the described filter element 12, the filter cover cap 45, the filter connection housing 13, and the adapter 11 for connecting the filter element 12 and the filter connection housing 13. The filter element 12 and also the filter cover cap 45 is in this case of a cylindrical shape, preferably of a circular cylindrical shape. The filter element 12 has a longitudinal center axis oriented orthogonal to the normal of the surface of the first flow opening 28 and/or the second flow opening. The surface center of gravity of the first opening cross-section 16 of the first opening 14 in the adapter 11 is displaced with respect to the longitudinal center axis of the filter element 12. In the offset direction, an expansion 19, and against the offset direction, a constriction 18 of the first opening cross-section 16 are defined such that as many surface portions as possible are displaced toward one side with respect to the longitudinal center axis of the filter element 12 within the first opening 14, in particular toward the side facing the first flow opening 28. Correspondingly, the first chamber 38 also comprises a geometry displaced with respect to a center axis or center plane. Specifically, the first chamber 38 is arranged adjacent to the first flow opening 28 and extends into a central area of the filter connection housing 13. The second chamber 39 is formed adjacent to the second flow opening 29 and is of peripheral extension partially enclosing the first chamber 38.

As is particularly obvious from FIG. 3, the first opening cross-section 16 is situated outside the second opening cross-section 17 in the projection of the first opening cross-section 16 onto the second opening cross-section 17. In this projection, the second opening cross-section 17 is at the same time also situated in part outside the first opening cross-section 16. Since the first opening cross-section 16 and the second opening cross-section 17 are arranged in parallel to each other in the specific embodiment, the projection of the first opening cross-section 16 onto the second opening cross-section 17 actually corresponds to the projection of the second opening cross-section 17 onto the first opening cross-section 16.

The filter connection housing may further comprise a venting device 48 including a sealing disc 49, wherein a lock screw 50 may be screwed into a bore 51 having a corresponding internal thread, wherein the lock screw 50 at the same time locks the bayonet catch 46 in such a manner that the filter cover cap 45 and the filter connection housing 13 are in compressed fluid-tight engagement.

By a connection bore 52, which may be covered at an outer end in a compressed fluid-tight manner by the sealing disc 49 and is in communication with the interior space of the filter connection housing 13, it may be ensured that pressure can only build up inside the filter connection housing 13 when the lock screw 50 is tightened and the sealing disc 49 presses on the connection bore 52. If the bayonet catch 46 is thus not correctly closed, the lock screw 50 cannot be screwed into the correct position, so that the connection bore 52 cannot be closed and pressure may not be established within the filter connection housing 13. When, however, the lock screw 50 is correctly screwed in, the bayonet catch 46 will be blocked and the connection bore 52 closed by the sealing disc 49 so that the filter arrangement can then operate.

An alternative embodiment of a filter arrangement according to the invention is illustrated in FIGS. 4 to 6. The structure of the filter arrangement according to FIGS. 4 to 6 largely corresponds to the structure of the filter arrangement according to FIGS. 1 to 3, however with the filter connection housing 13 being formed as an extrusion profile. In this respect, the first chamber 38 inside the base body 30 of the filter connection housing 13 is first formed to be purely cylindrical, namely in a cross-sectional shape of an isosceles triangle with rounded angles, wherein the first chamber 38 is directly closed by the cover 31 on the side facing away from the filter element 12.

Figure 7:
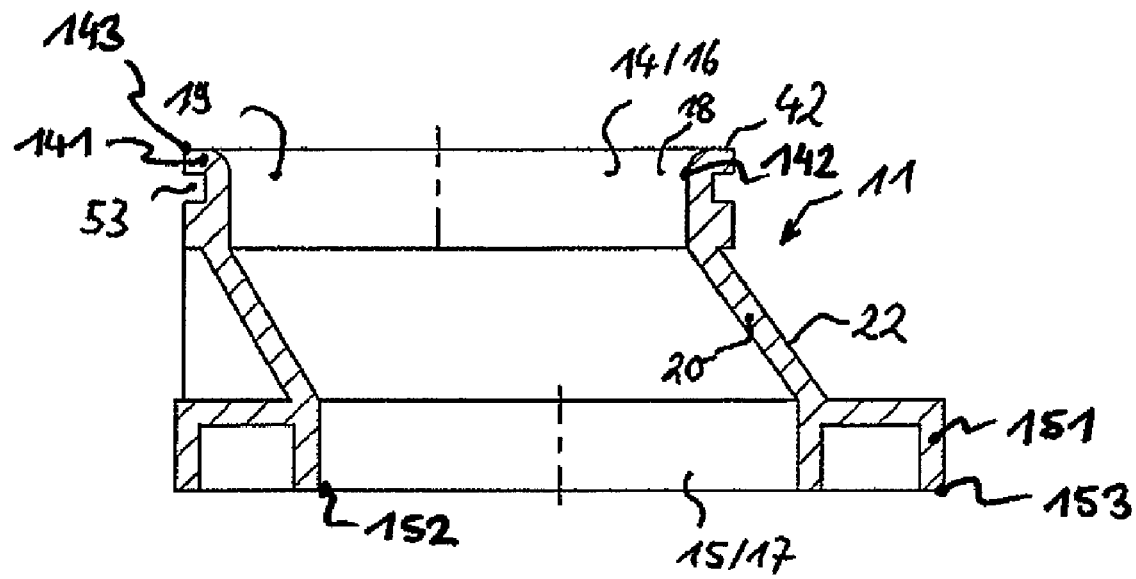
FIG. 7 is an axial sectional view of an embodiment of an adapter according to the invention.
Figure 8:
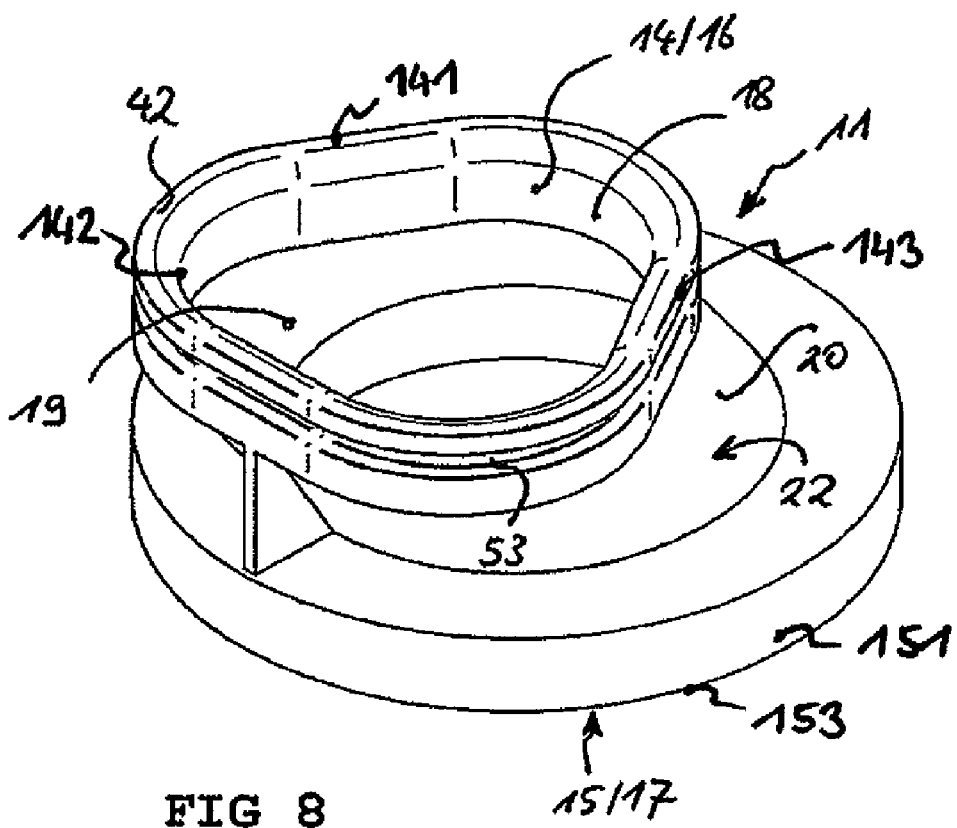
FIG. 8 is a perspective view of the embodiment of the adapter according to the invention shown in FIG. 7.

In FIGS. 7 and 8, the embodiment of an adapter according to the invention for connecting a filter element, which is used in the filter connection housings according to FIGS. 1 to 3 and FIGS. 4 to 6, respectively, is shown again separately and in more detail, reference also being made in this connection to the explanations provided on FIGS. 1 to 3. The first opening 14 of the adapter 11 is defined by a first edge 141, which moreover defines an inner contour 142 and an outer contour 143 of the first opening 14. In addition, the first edge 141 provides a groove 53 for receiving a seal. The inner contour 142 here is identical to the opening cross-section 16, which is also determined by the first edge 141. The first edge 141, which substantially constitutes the form of an isosceles triangle, is of uniform thickness along its circumference so that the boundary lines of the inner contour 142 and the outer contour 143 substantially run in parallel to each other. Since the first edge 141 is rounded in its extension toward the center of the first opening 14, the definition of the inner contour 142 of the first opening 14 is not fully distinct in the present case. A reasonable definition results from the inner contour 142 being the inner cross-sectional area in an area of the inner wall of the first edge 141 of the first opening 14, which is not or no longer rounded.

By the wall 20, which forms a flow guidance surface 22, the first edge 141 of the first opening 14 is integrally connected to the second edge 151 of the second opening 15. The second edge 15 defines an inner contour 152 and an outer contour 153 of the second opening 15. For the insertion of a filter element 12, not shown in the present case, the second edge 151 comprises a circumferential groove (not designated by a reference numeral) integrated into the second edge 151. The inner contour 152 may be defined here to be identical to the second opening cross-section 17 as the cross-sectional area through which compressed fluid flows perpendicularly when the adapter is in use. The outer contour 153, however, is defined by the circular outer surface of the outer peripheral edge of the circumferential groove.

FIG. 9 depicts the effect achieved by the offset of the adapter 11 in the inflow and outflow area of the filter connection housing 13 for illustrative purposes. Assuming an equal outer contour of the filter connection housing, the situation according to the prior art is shown on the left side for comparison, while the right side shows the enlargement of the second chamber 39 which is achieved by the offset of the first chamber 38 into the direction of the first flow opening 28, the enlargement which can lead to a reduction of the flow resistance. In the specifically proposed displacement of the center of gravity of the connection opening 40 of the first chamber 38 from a central position aligned on the longitudinal center axis back to the first flow opening 28 by 15 mm, the cross-section of the second chamber may be increased along the longitudinal center axis through the first flow opening 28 and the second flow opening 29 to 126%. Thus, more than a quarter of the original cross-sectional area is gained. This effect is based on the fact that the connection opening 40 of the first chamber 38 is displaced in the direction toward the first flow opening 28. Due to the additional asymmetric configuration, the offset is particularly effective.

As can be seen from the comparison in FIG. 9, the "narrowest points" $E_1$ and $E_2$, substantially co-influencing the differential pressure, are distinctly reduced.

Figure 10:
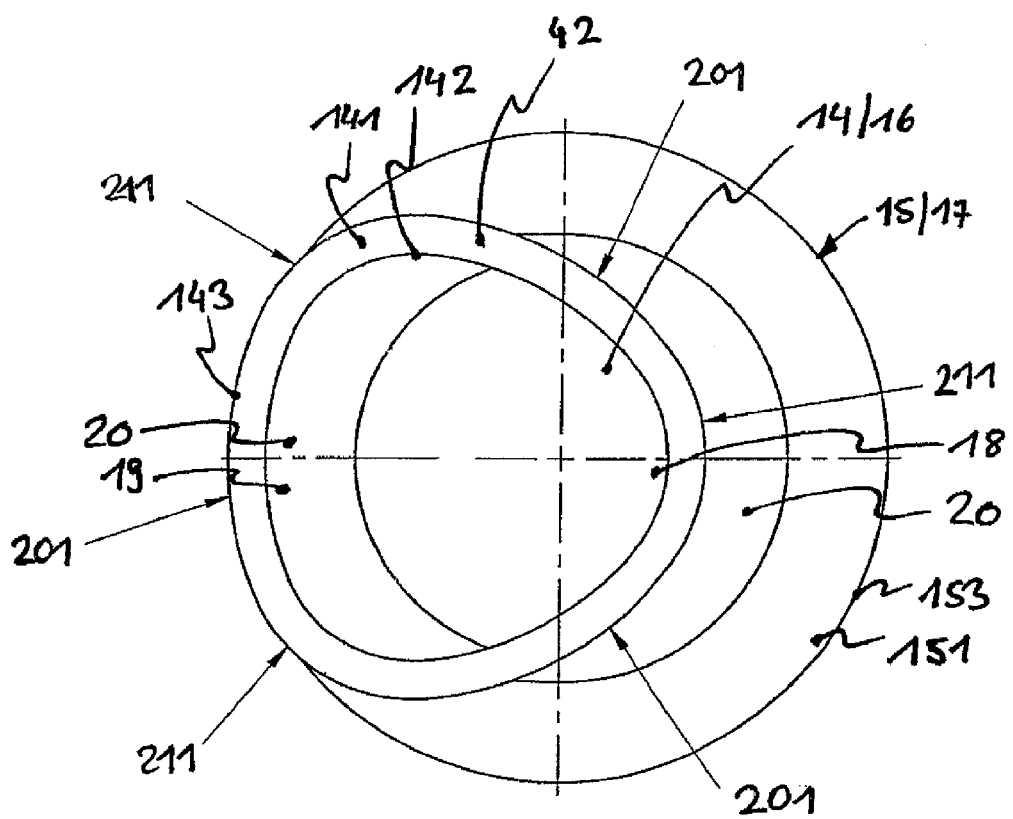
FIG. 10 is a plan view of the first opening of a further embodiment of an adapter according to the invention.
Figure 11:
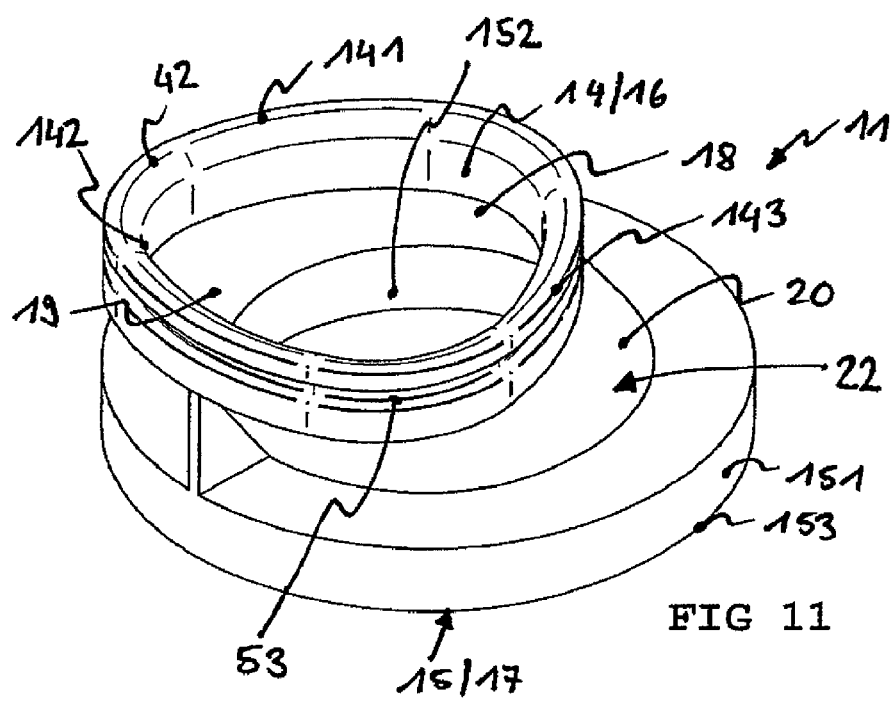
FIG. 11 is a perspective view of the embodiment of the adapter according to the invention shown in FIG. 10.

In comparison to the embodiments of the adapter 11 according to FIG. 7 and FIG. 9, a further development may also provide for the inner contour 142 and the outer contour 143 of the first opening 14 to comprise not only a triangular shape with rounded angles, but also the sides of the triangle itself to comprise roundings. Such an embodiment is illustrated in FIGS. 10 and 11. According to this embodiment, the sides of the triangular shape of the edge 141, which defines the inner contour 142 and the outer contour 143 of the first opening 14, have a distinctly larger rounding radius 202 of a first circle 201 (or arc of circle) than the rounding radii 212 of a second circle 211 (or arc of circle) of the angles.

When accordingly describing the rounded shapes of the angles of the triangular shape by a circumference line or a circular arc, they will have a distinctly larger curvature as compared to the curvatures of the sides of the triangular shape of the edge 141. The inner contour 142 and also the outer contour 143 may thus be represented in the present case as a sequence of three alternations of two different interconnected curvatures having the same sign. In the present case, the curvatures are exclusively convex, but could also be configured to be concave in an alternative embodiment. In the following, reference is made in particular to FIG. 7 and FIG. 8 for explaining the preceding embodiments.

Figure 12:
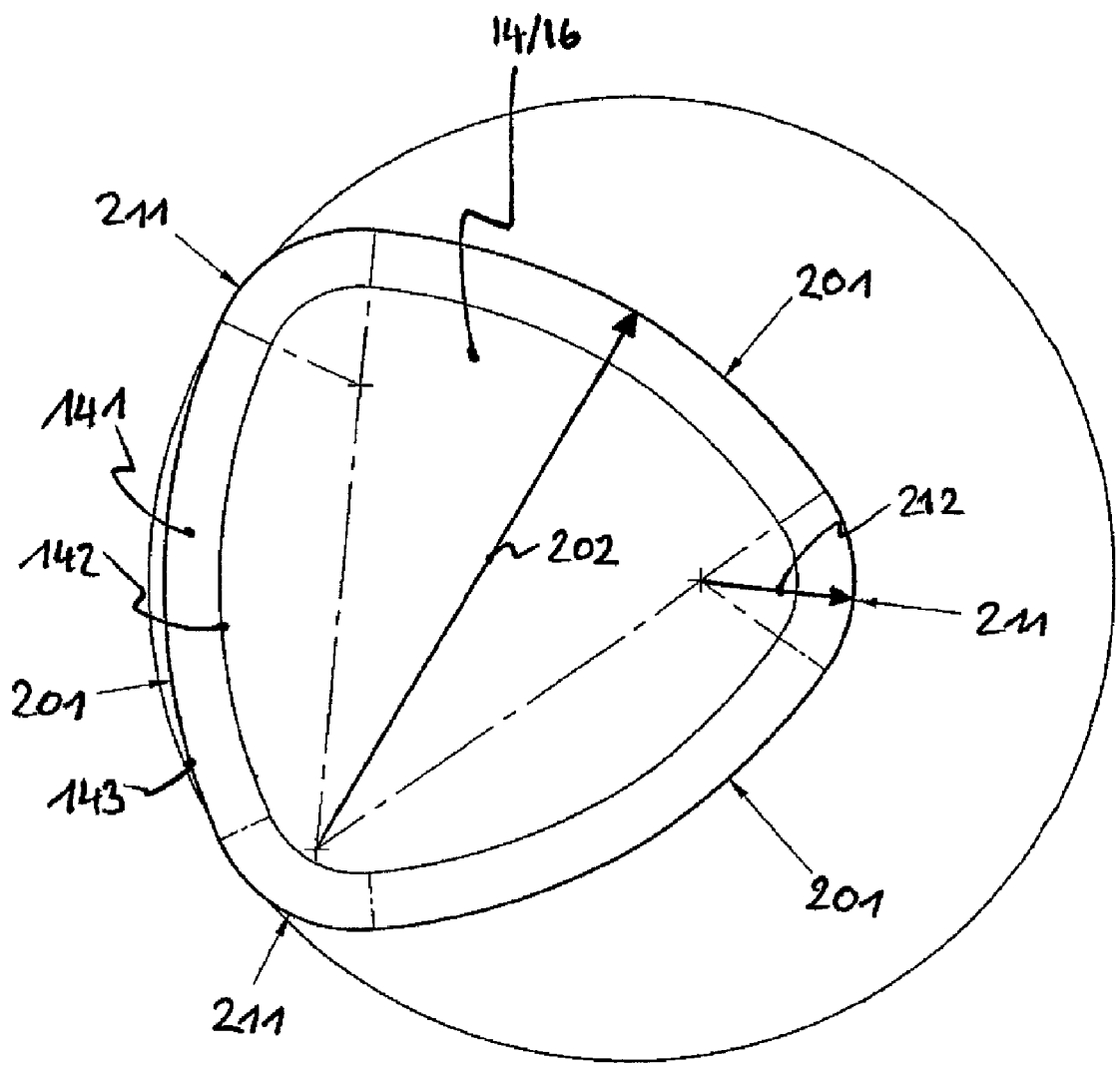
FIG. 12 is a schematic diagram for a detailed representation of the geometry of the adapter according to FIG. 10 and FIG. 11.

The basic geometry of the first opening 14 according to FIG. 10 and FIG. 11 is represented once again in a schematic diagram in FIG. 12. Here, the larger rounding radii 202 of the first circle 201 (or arc of circle), which describe the rounded sides of the triangle, are seen distinctly when compared to the smaller rounding radii 212 of the second circle 211 (or arc of circle), which describe the rounded angles of the triangle. Moreover, all of the median points of the single circles or arcs of circle are different from each other.

In a representation of the contour of the first opening 14 deviating from a circular shape, the inner contour 142 and the outer contours 143, as well, may be described by their geometrical relationship to an imaginary circle 160. According to this representation, it is first provided for the inner contour 142 to be symmetrical to a center line S oriented in the offset direction R. The offset direction R ensues from the inner contour 142 of the first opening 14 and the inner contour of the second opening 15 being offset from each other such that the surface center of gravity of the first opening cross-section 16 is displaced in relation to the normal extending from the surface center of gravity of the second opening cross-section 17 in the offset direction R. The inner contour 142 is in this case configured to be completely convex circumferentially. The imaginary circle 160 can now be inscribed into the inner contour 142, such that the latter is contacted at two diametrically opposed tangential points $T_1$, $T_2$ on the center line S (in the case of the outer contour, tangential points $T_3$, $T_4$). The two points $T_1$, $T_2$ also define the diameter line L. In this case, the circle 160 intersects the inner contour 142 at two intersection points $P_1$, $P_2$ (intersection points $P_3$, $P_4$ in the case of the outer contour). A connection line V may be defined by these intersection points $P_1$, $P_2$, which is vertical on the center line S and intersects the center line at point X. The inner contour 142 is now defined such that the side of the inner contour 142 situated in the offset direction R lies completely inside the circle 160, and the side situated opposite the offset direction R lies completely within the circle 160. In addition, the intersection point X is displaced in the offset direction R with respect to the third surface center of gravity 163 of the inner contour 142. The center point M of the circle 160, however, is displaced along the center line S against the offset direction R. The length of the distance of intersection point X from the surface center of gravity 163 is determined by the size of the surface segments A and B which cause the present shape of the first opening 14 to deviate from the circular shape 160.

The representation of the outer contour 143 may be described analogously to the representation of the contour of the inner contour 142 of the first opening 14 deviating from the circular (see lower drawing in FIG. 13a). In this case, however, diameter $D_a$ of the outer contour 143 differs from the diameter of the inner contour $D_i$ substantially by the amount which corresponds to the thickness of the edge 141 of the first opening 14.

The derivation of the outer contour of the first opening 14 deviating from the circular is represented in the two FIG. 13b drawings, representing the embodiment of an adapter according to the invention from FIGS. 10, 11, and 12. According to the transformation for representing the outer contour 143 according to the invention (lower drawing), as well as for representing the inner contour 142 (upper drawing) of the first opening 14, the same is based on a translation of a circle 165, centrically aligned in relation to the surface center of gravity of the normal extending from the second opening 15 and is first moved by an offset R1 to the left (corresponding to the present representation). Accordingly, the first surface center of gravity 161 of the circle 165 passes over into a second circle 166 having a second surface center of gravity 162. For the derivation of, for example, an adapted inner contour 142 of the first opening 14 (see the upper drawing), predetermined surface areas are substantially removed from the one semicircle surface of the displaced circle 166 and added to the other side of the displaced circle 166, sometimes with the same surface area. The removed semicircle area sections on the side facing away from the offset direction R in the present case are emphasized in FIG. 13b by cross-hatching. The surface areas which are substantially added to the displaced circle 166 on the side facing into the offset direction R are emphasized by line-hatching. In the present case, the redistribution of the surface areas leads to a further displacement (offset) R2 of the second surface center of gravity 162 to the new, third surface center of gravity 163. Consequently, the displacement of the first surface center of gravity 161 instead of the two offsets of R1 and R2 may also be depicted by a single offset R (=R1+R2) comparable to the representations in FIG. 13a.

As illustrated in the upper row of the representation of FIG. 13b for the derivation of the inner contour 142 of the first opening 14, the outer contour 143 may likewise also be illustrated in a corresponding manner (lower drawing), the circle 165, which has to be taken as a starting point in this context for the transformation, comprising a correspondingly larger radius. The circumstance must also be emphasized that with an identical transformation, such as in the case of the representation of the inner contour 142, also in the case of a representation of the outer contour 143, the surface center of gravity 161 of the larger circle 165, just like the surface center of gravity 161 of the smaller circle 162, will experience an offset by first R1 and then will be displaced by a subsequent further offset R2. The correspondingly resulting edge 141 of the first opening 14 exhibiting a uniform thickness along its circumference.

An alternative formulation of this transformation consists in the definition of an average width of both sides of the circle 165, which is already displaced by R1. Accordingly, the transformation may ensue such that after displacing the circle 165 by R1, a displacement of surface sections of the one semicircle which faces into the offset direction R comprises a larger average width than the side of the circle 165 facing away from the offset direction R. The average width of one side may be defined as the distance of two intersections points of a normal to the offset direction through the surface center of gravity of the respective semicircle from the edges of the surface shape resulting from the redistribution. As an alternative, the average width may also be defined as a quotient of the surface area of a surface portion and the length of the extension of the surface portion into the offset direction, wherein the surface portion is defined as a sectional view of the edges of the surface shape resulting from the redistribution and the straight line running perpendicular to the offset direction R through the surface center of gravity of the surface shape resulting from the redistribution.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

We claim:

1. A filter arrangement comprising a filter connection housing (13), a filter element (12) and a compressed air filter adapter (11) configured and defined for connecting the filter element (12) to the filter connection housing (13), the filter connection housing (13) comprising a lateral first flow opening (28) and an opposite, lateral second flow opening (29), an inner space divided by a downward-open partition (37) into a first chamber (38) that connects to the first flow opening (28) and a second chamber (39) that connects to the second flow opening (29), the first chamber (38) comprising a connection opening (40) at the lower side of the filter connection housing for connection of a connection profile (42) of the compressed air filter adapter, and the compressed air in the first chamber (38) and the second chamber (39) flowing past each other, wherein the adapter (11) has a flow duct (21) enclosed by a wall (20) for compressed air, wherein the flow duct (21) is delimited at a first end by a first opening (14) having an inner contour (142) defined by a first edge (141) and an outer contour (143), and at a second end by a second opening (15) substantially parallel to the first opening (14) and has an inner contour (152) defined by a second edge (151) and an outer contour (153), wherein the first opening (14) is provided for fluid-tight connection of the compressed air filter adapter (11) connection profile (42), substantially determined by the first outer contour (143), to the connection opening (40) of the filter connection housing (13) and forms an opening cross-section (16) defined by the inner contour (142) of the first opening (14), wherein the second opening (15) defines an opening on the filter side and forms a second opening cross-section (17), defined by the inner contour (152) of the second opening (15), wherein the inner contour (142) of the first opening (14) and the inner contour of the second opening (15) are offset from each other, such that the surface center of gravity of the first opening cross-section (16) is displaced in relation to the normal extending from the surface center of gravity of the second opening cross-section (17) in an offset direction (R), wherein the outer contour (143) of the first opening (14) has a basic shape that deviates from the circular, such that the outer contour (143) is derived from a transformation of a circle (165) that is centrically aligned in relation to the normal extending from the surface center of gravity of the second opening (15), the circle being displaced in the direction of the offset direction (R) by a length R1 and defining a displaced circle (166) and comprising surface reductions (18) or surface enlargements (19) on the side of the circle (166) pointing in the offset direction (R) by removing or adding surface sections, and comprising surface enlargements (19) or surface reductions (18) corresponding to the surface reductions (18) or the surface enlargements (19) on the side pointing opposite from the offset direction (R) by adding or removing surface sections of essentially equal size as the surface reductions (18) or surface enlargements (19) on the side of the circle (166) pointing in the offset direction (R), and the surface enlargements (19) substantially being formed in the offset direction (R) and the surface reductions (18) substantially being formed against the offset direction (R), and wherein the outer contour (143) of the first opening (14) has substantially the basic shape of a triangle with rounded edges or angles.

2. The filter arrangement according to claim 1, wherein the surface reductions (18) and surface enlargements (19) are arranged mirror-symmetrical to a center line S oriented in the offset direction (R).

3. The filter arrangement according to claim 1, wherein the outer contour (143) has a substantially convex edge.

4. The filter arrangement according to claim 3, wherein the outer contour (143) of the first opening (14) has the basic shape of an isosceles triangle.

5. The filter arrangement according to claim 4, wherein the rounding to the sides of the triangle can be described by circular arcs of a first circle (201) having a first radius (202) and the rounding to the angles of the triangle can be described by circular arcs of a second circle (211) having a second radius (212), wherein the circular arcs tangentially give way to one another, and the circular arcs comprise at least three imaginary median circle points deviating from each other.

6. The filter arrangement according to claim 5, wherein the ratio of the second radius (212) to the first radius (202) is at least 1.5 and less than 10.

7. The filter arrangement according to claim 5, wherein the ratio of the second radius (212) to the first radius (202) is between 2 and 4.

8. The filter arrangement according to claim 1, wherein the surface reductions (18) and surface enlargements (19) do not come into any contact with the two areas of the intersection points of a center line S oriented in the offset direction (R) including the circle (166) displaced in the offset direction (R).

9. The filter arrangement according to claim 1, wherein the surface center of gravity (162) of the circle (166) displaced in the offset direction (R) is again displaced by a length R2 in the offset direction (R) by realizing the surface reductions (18) and surface enlargements (19) in the offset direction (R).

10. The filter arrangement according to claim 1, wherein the tip of the triangle is situated on a center line S oriented in the offset direction (R) and the base of the triangle perpendicularly intersects the center line S, and wherein the area facing the tip of the triangle forms the surface reductions (18) and the area facing the base forms the surface enlargements (19).

11. The filter arrangement according to claim 1, wherein the basic shape of the inner contour (142) of the first opening (14) substantially corresponds to the basic shape of the outer contour (143) of the first opening (14).

12. The filter arrangement according to claim 1, wherein the first opening cross-section (16) and the second opening cross-section (17) are arranged substantially in parallel to each other.

13. The filter arrangement according to claim 1, wherein the adapter (11) is formed to be a separate component for connection to a filter element (12) as well as to the filter connection housing (13).

14. The filter arrangement according to claim 1, wherein the wall of the adapter (11) comprises an exterior flow guiding surface, so as to guide a flow of compressed air past the outside of the adapter (11).

15. The filter arrangement according to claim 14, wherein the flow guiding surface (22) substantially follows the offset between the first opening (14) and the second opening (15).

16. The filter arrangement r according to claim 1, wherein in the projection of the first opening cross-section (16) onto the second opening cross-section (17), the first opening cross-section (16) is situated in part outside the second opening cross-section (17).

17. The filter arrangement according to claim 1, wherein in the projection of the first opening cross-section (16) onto the second opening cross-section (17), the second opening cross-section (17) is situated in part outside the first opening cross-section (16).

18. The filter arrangement according to claim 1, wherein in the projection of the second opening cross-section (17) onto the first opening cross-section (16), the first opening cross-section (16) is situated in part outside the second opening cross-section (17).

19. The filter arrangement according to claim 1, wherein in the projection of the second opening cross-section (17) onto the first opening cross-section (16), the second opening cross-section (17) is situated in part outside the first opening cross-section (16).

20. The filter arrangement according to claim 1, wherein at least one circumferential seal (25) is formed on the wall (20) for establishing a fluid-tight seal with respect to the filter connection housing with the filter element (12) inserted in the operating position.

21. The filter arrangement according to claim 1, wherein the wall of the adapter (11) comprises an exterior flow guiding surface for conducting a flow of compressed air guided past the outside of the adapter (11) to a flow opening (29) in such a manner that there is at least a local reduction of the flow resistance due to the extension of the flow guiding surface.

22. The filter arrangement according to claim 21, wherein the flow resistance is reduced by enlarging the cross-section of the flow duct.

23. The filter arrangement according to claim 1, wherein the filter connection housing (13) comprises a first flow opening (28) as an inlet or outlet and a second flow opening (29) as an outlet or inlet, wherein the offset direction (R) of the adapter (11) is oriented in the direction toward the first flow opening (28).

24. A compressed air filter adapter for connecting a filter element (12) to a filter connection housing (13), the filter connection housing (13) comprising a lateral first flow opening (28) and an opposite, lateral second flow opening (29), an inner space divided by a downward-open partition (37) into a first chamber (38) that connects to the first flow opening (28) and a second chamber (39) that connects to the second flow opening (29), the first chamber (38) comprising a connection opening (40) at the lower side of the filter connection housing for connection of a connection profile (42) of the compressed air filter adapter, and the compressed air in the first chamber (38) and the second chamber (39) flowing past each other,
    wherein the adapter (11) has a flow duct (21) enclosed by a wall (20) for compressed air,
    wherein the flow duct (21) is delimited at a first end by a first opening (14) having an inner contour (142) defined by a first edge (141) and an outer contour (143), and at a second end by a second opening (15) substantially parallel to the first opening (14) and has an inner contour (152) defined by a second edge (151) and an outer contour (153),
    wherein the first opening (14) is provided for fluid-tight connection of the compressed air filter adapter (11) connection profile (42), substantially determined by the first outer contour (143), to the connection opening (40) of the filter connection housing (13) and forms an opening cross-section (16) defined by the inner contour (142) of the first opening (14),
    wherein the second opening (15) defines an opening on the filter side and forms a second opening cross-section (17), defined by the inner contour (152) of the second opening (15),
    wherein the inner contour (142) of the first opening (14) and the inner contour of the second opening (15) are offset from each other, such that the surface center of gravity of the first opening cross-section (16) is displaced in relation to the normal extending from the surface center of gravity of the second opening cross-section (17) in an offset direction (R),
    wherein the outer contour (143) of the first opening (14) has a basic shape that deviates from the circular, such that the outer contour (143) is derived from a transformation of a circle (165) that is centrically aligned in relation to the normal extending from the surface center of gravity of the second opening (15), the circle being displaced in the direction of the offset direction (R) by a length R1 and defining a displaced circle (166) and comprising surface reductions (18) or surface enlargements (19) on the side of the circle (166) pointing in the offset direction (R) by removing or adding surface sections, and comprising surface enlargements (19) or surface reductions (18) corresponding to the surface reductions (18) or the surface enlargements (19) on the side pointing opposite from the offset direction (R) by adding or removing surface sections of essentially equal size as the surface reductions (18) or surface enlargements (19) on the side of the circle (166) pointing in the offset direction (R), and the surface enlargements (19) substantially being formed in the offset direction (R) and the surface reductions (18) substantially being formed against the offset direction (R),
    wherein the outer contour (143) of the first opening (14) has substantially the basic shape of a triangle with rounded edges or angles, and
    wherein the adapter (11) is integrally molded to the filter element (12) and together with it forms a filter unit.

25. A filter arrangement comprising a filter connection housing (13), a filter element (12) and a compressed air filter adapter (11) configured and defined for connecting the filter element (12) to the filter connection housing (13), the filter connection housing (13) comprising a lateral first flow opening (28) and an opposite, lateral second flow opening (29), and including an inner space divided by a downward-open partition (37) into a first chamber (38) that connects to the first flow opening (28) and a second chamber (39) that connects to the second flow opening (29), the first chamber (38) comprising a connection opening (40) for connection of a connection profile (42) of the compressed air filter adapter, and the compressed air in first chamber (38) and second chamber (39) flowing past each other,
    wherein the adapter (11) has a flow duct (21) enclosed by a wall (20) for compressed air,
    wherein the flow duct (21) is delimited at a first end by a first opening (14) having an inner contour (142) defined by a first edge (141) and an outer contour (143), and at a second end by a second opening (15) substantially parallel to the first opening (14) and has an inner contour (152) defined by a second edge (151) and an outer contour (153),
    wherein the first opening (14) is provided for the fluid-tight connection of the compressed air filter adapter (11) connection profile (42), substantially determined by the first outer contour (143), to the connection opening (40) of the filter connection housing (13) and forms an opening cross-section (16) defined by the inner contour (142) of the first opening (14),
    wherein the second opening (15) defines an opening on the filter side and forms a second opening cross-section (17) defined by the inner contour (152) of the second opening (15),
    wherein the inner contour (142) of the first opening (14) and the inner contour of the second opening (15) are offset from each other such that the surface center of gravity of the first opening cross-section (16) is displaced in relation to the normal extending from the surface center of gravity of the second opening cross-section (17) in an offset direction (R), wherein the inner contour (142) is symmetrical to a center line S oriented in the offset direction (R), wherein the inner contour (142) is configured to be completely convex circumferentially, wherein a circle (160) contacts the inner contour (142) at two diametrically opposite tangential points ($T_1$, $T_2$) on the center line, wherein the circle (160) intersects the inner contour (142) at two intersection points ($P_1$, $P_2$), wherein, in relation to a connection line V between the intersection points ($P_1$, $P_2$), the circle on the side situated in the offset direction (R) lies completely inside the inner contour (142), and on the side situated opposite the offset direction (R) lies completely outside the inner contour (142), and wherein the outer contour (143) of the first opening (14) has substantially the basic shape of a triangle with rounded edges or angles.

26. The filter arrangement according to claim 25, wherein the connection line (V) intersects the center line S at a point (X), displaced in the offset direction (R) with respect to the surface center of gravity (163) of the inner contour (142).

27. The filter arrangement according to claim 25, wherein the median point (M) of the circle (160) on the center line (S) is situated on the side opposite the offset direction (R) in relation to the surface center of gravity (163) of the inner contour (142).

28. The filter arrangement according to claim 25, wherein the inner contour (142) has a triangular basic shape with rounded edges or angles.

29. A filter arrangement comprising a filter connection housing (13), a filter element (12) and a compressed air filter adapter (11) configured and defined for connecting the filter element (12) to the filter connection housing (13), the filter connection housing (13) comprising a lateral first flow opening (28) and an opposite, lateral second flow opening (29), an inner space divided by a downward-open partition (37) into a first chamber (38) that connects to the first flow opening (28) and a second chamber (39) that connects to the second flow opening (29), the first chamber (38) comprising a connection opening (40) for connection of a connection profile (42) of the compressed air filter adapter, and the compressed air in first chamber (38) and second chamber (39) flowing past each other, wherein the adapter (11) has a flow duct (21) enclosed by a wall (20) for compressed air, wherein the flow duct (21) is delimited at a first end by a first opening (14) having an inner contour (142) defined by a first edge (141) and an outer contour (143), and at a second end by a second opening (15) substantially parallel to the first opening (14) and has an inner contour (152) defined by a second edge (151) and an outer contour (153), wherein the first opening (14) is provided for the fluid-tight connection of the compressed air filter adapter (11) connection profile (42), substantially defined by the first outer contour (143) to the connection opening (40) of the filter connection housing (13) and forms an opening cross-section (16), defined by the inner contour (142) of the first opening (14), wherein the second opening (15) defines an opening on the filter side and forms a second opening cross-section (17), defined by the inner contour (152) of the second opening (15), wherein the inner contour (142) of the first opening (14) and the inner contour of the second opening (15) are offset from each other, such that the surface center of gravity of the first opening cross-section (16) is displaced in relation to the normal extending from the surface center of gravity of the second opening cross-section (17) in an offset direction (R), wherein the outer contour (143) is symmetrical to a center line S oriented in the offset direction (R), wherein the inner contour (143) is configured to be completely convex circumferentially, wherein a circle (160) contacts the outer contour (143) at two diametrically opposite tangential points ($T_3$, $T_4$) on the center line, wherein the circle (160) intersects the outer contour (143) at two intersection points ($P_3$, $P_4$), wherein, in relation to a connection line V between the intersection points ($P_3$, $P_4$), the circle on the side situated in the offset direction (R) lies completely inside the outer contour (143), and on the side situated opposite the offset direction (R) lies completely outside the outer contour (143), and wherein the outer contour (143) of the first opening (14) has substantially the basic shape of a triangle with rounded edges or angles.

30. The filter arrangement according to claim 29, wherein the connection line (V) intersects the center line S at a point (X) displaced in the offset direction (R) with respect to the surface center of gravity (163) of the outer contour (143).

31. The filter arrangement according to claim 29, wherein the median point (M) of the circle (160) on the center line (S) is situated on the side opposite the offset direction (R) in relation to the surface center of gravity (163) of the outer contour (143).

32. A filter arrangement comprising a filter connection housing (13), a filter element (12) and a compressed air filter adapter (11) configured and defined for connecting the filter element (12) to the filter connection housing (13), the filter connection housing (13) comprising a lateral first flow opening (28) and an opposite, lateral second flow opening (29), an inner space divided by a downward-open partition (37) into a first chamber (38) that connects to the first flow opening (28) and a second chamber (39) that connects to the second flow opening (29), the first chamber (38) comprising a connection opening (40) for the connection of a connection profile (42) of the compressed air filter adapter, and the compressed air in first chamber (38) and second chamber (39) flowing past each other, wherein the adapter (11) has a flow duct (21) enclosed by a wall (20) for compressed air, wherein the flow duct (21) is delimited at a first end by a first opening (14) having an inner contour (142) defined by a first edge (141) and an outer contour (143), and at a second end by a second opening (15) which is substantially parallel to the first opening (14) and has an inner contour (152) defined by a second edge (151) and an outer contour (153), wherein the first opening (14) is provided for the fluid-tight connection of the compressed air filter adapter (11) connection profile (42), substantially determined by the first outer contour (143), to the connection opening (40) of the filter connection housing (13) and forms an opening cross-section (16) defined by the inner contour (142) of the first opening (14), wherein the second opening (15) defines an opening on the filter side and forms a second opening cross-section (17) defined by the inner contour (152) of the second opening (15), wherein the inner contour (142) of the first opening (14) and the inner contour of the second opening (15) are offset from each other such that the surface center of gravity of the first opening cross-section (16) is displaced in relation to the normal extending from the surface center of gravity of the second opening cross-section (17) in an offset direction (R), wherein the outer contour (143) of the first opening (14) has a basic shape that deviates from the circular, such that the outer contour (143) is derived from a transformation of a circle (160), the outer contour (143) comprising surface enlargements (19) on a side of a diameter line L perpendicular to the normal extending from the surface center of gravity of the second opening (15) and comprising surface reductions (18) on the other side, wherein the outer contour (143) of the first opening (14) has the basic shape of an isosceles triangle, the area facing the tip of the triangle forming the surface reductions (18) and the area facing the base forming the surface enlargements (19), and the surface enlargements (18) being formed substantially in the offset direction (R), and the surface reductions (18) being formed substantially against the offset direction (R), wherein both the angles and the sides are configured to be rounded and to define the rounded shapes of the sides of the triangle by circular arcs of a first circle (201) having a first radius (202), and to define the rounded shapes of the angles of the triangle by circular arcs of a second circle (211) having a second radius (212), the circular arcs tangentially giving way to one another, and the circular arcs each comprising median circle points deviating from each other for describing the rounded shapes of the edges, and wherein the ratio of the second radius (212) to the first radius (202) is between 2 and 4.

33. A filter element comprising a filter casing (43) having a flat inflow/outflow surface (27), wherein the filter element has a cylindrical basic structure, and an integrally molded adapter for connecting a filter element (12) to a filter connection housing (13), the filter connection housing (13) comprising a lateral first flow opening (28) and an opposite, lateral second flow opening (29), an inner space divided by a downward-open partition (37) into a first chamber (38) that connects to the first flow opening (28) and a second chamber (39) that connects to the second flow opening (29), the first chamber (38) comprising a connection opening (40) at the lower side of the filter connection housing for connection of a connection profile (42) of the compressed air filter adapter, and the compressed air in the first chamber (38) and the second chamber (39) flowing past each other, wherein the adapter (11) has a flow duct (21) enclosed by a wall (20) for compressed air, wherein the flow duct (21) is delimited at a first end by a first opening (14) having an inner contour (142) defined by a first edge (141) and an outer contour (143), and at a second end by a second opening (15) substantially parallel to the first opening (14) and has an inner contour (152) defined by a second edge (151) and an outer contour (153), wherein the first opening (14) is provided for fluid-tight connection of the compressed air filter adapter (11) connection profile (42), substantially determined by the first outer contour (143), to the connection opening (40) of the filter connection housing (13) and forms an opening cross-section (16) defined by the inner contour (142) of the first opening (14), wherein the second opening (15) defines an opening on the filter side and forms a second opening cross-section (17), defined by the inner contour (15) of the second opening (15), wherein the inner contour (142) of the first opening (14) and the inner contour of the second opening (15) are offset from each other, such that the surface center of gravity of the first opening cross-section (16) is displaced in relation to the normal extending from the surface center of gravity of the second opening cross-section (17) in an offset direction (R), wherein the outer contour (143) of the first opening (14) has a basic shape that deviates from the circular, such that the outer contour (143) is derived from a transformation of a circle (165) that is centrically aligned in relation to the normal extending from the surface center of gravity of the second opening (15), the circle being displaced in the direction of the offset direction (R) by a length R1 and defining a displaced circle (166) and comprising surface reductions (18) or surface enlargements (19) on the side of the circle (166) pointing in the offset direction (R) by removing or adding surface sections, and comprising surface enlargements (19) or surface reductions 08) corresponding to the surface reductions (18) or the surface enlargements (19) on the side pointing opposite from the offset direction (R) by adding or removing surface sections of essentially equal size as the surface reductions (18) or surface enlargements (19) on the side of the circle (166) pointing in the offset direction (R), and the surface enlargements (19) substantially being formed in the offset direction (R) and the surface reductions (18) substantially being formed against the offset direction (R), and wherein the outer contour (143) of the first opening (14) has substantially the basic shape of a triangle with rounded edges or angles.

34. A method of connecting a filter element (12) to a filter connection housing (13), wherein the filter connection housing (13) comprises a first flow opening (28) and a second flow opening (29), wherein an adapter is used for connecting the filter element (12) to the filter connection housing (13), the filter connection housing (13) comprising a lateral first flow opening (28) and an opposite, lateral second flow opening (29), an inner space divided by a downward-open partition (37) into a first chamber (38) that connects to the first flow opening (28) and a second chamber (39) that connects to the second flow opening (29), the first chamber (38) comprising a connection opening (40) at the lower side of the filter connection housing for the connection of a connection profile (42) of the compressed air filter adapter, and the compressed air in first chamber (38) and second chamber (39) flowing past each other, wherein the adapter (11) has a flow duct (21) enclosed by a wall (20) for compressed air, wherein the flow duct (21) is delimited at a first end by a first opening (14) having an inner contour (142) defined by a first edge (141) and an outer contour (143), and at a second end by a second opening (15), which is substantially parallel to the first opening (14) and has an inner contour (152) defined by a second edge (151) and an outer contour (153), wherein the first opening (14) is provided for the fluid-tight connection of the compressed air filter adapter (11) connection profile (42), substantially determined by the first outer contour (143), to the connection opening (40) of the filter connection housing (13) and forms an opening cross-section (16) defined by the inner contour (142) of the first opening (14), and wherein the second opening (15) defines an opening on the filter side and forms a second opening cross-section (17) defined by the inner contour (152) of the second opening (15), wherein the inner contour (142) of the first opening (14) and the inner contour (152) of the second opening (15) are offset from each other, such that the surface center of gravity of the first opening cross-section (16) is displaced in relation to the normal extending from the surface center of gravity of the second opening cross-section (17) in an offset direction (R), wherein the outer contour (143) of the first opening (14) has a basic shape that deviates from the circular such that the outer contour (143) is derived from a transformation of a circle (165) centrically aligned in relation to the normal extending from the surface center of gravity of the second opening (15), the circle being displaced in the direction of the offset direction (R) by a length R1 and defining a displaced circle (166), and comprising surface reductions (18) or surface enlargements (19) on the side of the circle (166) pointing in the offset direction (R) by removing or adding surface sections, and comprising surface enlargements (19) or surface reductions (18) corresponding to the surface reductions (18) or the surface enlargements (19) on the side pointing opposite from the offset direction (R) by adding or removing surface sections of substantially equal size as the surface reductions (18) or surface enlargements (19) on the side of the circle (166) pointing in the offset direction (R), and the surface enlargements (19) being formed substantially in the offset direction (R) and the surface reductions (18) being formed substantially against the offset direction (R), wherein the outer contour (143) of the first opening (14) has substantially the basic shape of a triangle with rounded edges or angles, and wherein the filter element (12) is joined to the filter connection housing (13) in a compressed fluid-tight manner by an adapter (11), such that the flow path from the first flow opening (28) to the second flow opening (29) is guided through the filter element (12).

* * * * *